United States Patent
Agarwal

(10) Patent No.: US 10,469,547 B2
(45) Date of Patent: Nov. 5, 2019

(54) ONLINE DISTRIBUTED INTERACTION

(71) Applicant: edX Inc., Cambridge, MA (US)

(72) Inventor: Anant Agarwal, Weston, MA (US)

(73) Assignee: edX Inc., Cambridge, MA (US)

( * ) Notice: Subject to any disclaimer, the term of this patent is extended or adjusted under 35 U.S.C. 154(b) by 0 days.

(21) Appl. No.: 13/760,721

(22) Filed: Feb. 6, 2013

(65) Prior Publication Data

US 2013/0204942 A1    Aug. 8, 2013

Related U.S. Application Data

(60) Provisional application No. 61/595,307, filed on Feb. 6, 2012.

(51) Int. Cl.
*H04L 29/06* (2006.01)
*G09B 5/00* (2006.01)
*G09B 7/04* (2006.01)

(52) U.S. Cl.
CPC .............. *H04L 65/403* (2013.01); *G09B 5/00* (2013.01); *G09B 7/04* (2013.01)

(58) Field of Classification Search
CPC . H04L 29/06; H04L 65/4076; H04L 65/4084; H04L 65/60
See application file for complete search history.

(56) References Cited

U.S. PATENT DOCUMENTS

| | | | |
|---|---|---|---|
| RE39,942 E * | 12/2007 | Fai et al. | 434/350 |
| 2005/0081159 A1* | 4/2005 | Gupta | G06F 17/22 715/751 |
| 2008/0222274 A1* | 9/2008 | Millstein | G06F 17/3089 709/219 |
| 2011/0039244 A1* | 2/2011 | Packard | G09B 5/00 434/350 |
| 2011/0212430 A1* | 9/2011 | Smithmier et al. | 434/322 |
| 2013/0027428 A1* | 1/2013 | Graham | H04L 51/32 345/633 |
| 2014/0108498 A1* | 4/2014 | Berkebile | G06F 17/30174 709/203 |

* cited by examiner

*Primary Examiner* — Hee Soo Kim
*Assistant Examiner* — Sanjoy K Roy
(74) *Attorney, Agent, or Firm* — Occhiuti & Rohlicek LLP

(57) ABSTRACT

An interaction environment for presentation of content to a population of users includes either or both of a plurality of cohort interaction environments and one or more content-linked interaction environments.

9 Claims, 2 Drawing Sheets

Figure 1

ONLINE DISTRIBUTED INTERACTION

CROSS-REFERENCE TO RELATED APPLICATIONS

This application claims the benefit of U.S. Provisional Application No. 61/595,307, filed on Feb. 6, 2012, the content of which is incorporated herein by reference.

This application is also related to copending U.S. application Ser. No. 13/760,707, titled "Caption-Based Navigation for a Video Player," filed on Feb. 6, 2013, which claims the benefit of U.S. Provisional Application No. 61/595,383, filed on Feb. 6, 2012. The contents of these applications are incorporated herein by reference.

BACKGROUND

This invention relates to facilitating interactions among distributed users of an online system, such as an online learning platform accessible over the Internet over the internet, or on a system on a laptop or server, or over a network.

In online environments, for example, online education and learning, content is made available to users using a browser over the internet. In environments such as this it is useful to have a discussion forum where users can ask questions or discuss various pieces of material in the course (or material outside the course). The questions may be answered by other users, by teaching assistants or by the teachers of the course. Similarly others may join in the discussion.

In online education, for example, a course may have many weeks of material covering many topics. Learners may also be distributed worldwide. In many cases, users may be allowed to start a course at any time. In other words, all users taking a given course might not be starting at the same time, or be in the same place. Thus, at any given time, different people around the world might be at different parts of the course.

A difficulty with discussion forums in such environments is that the discussions or questions posted at any given point in time might cover a wide range of topics from any part of the course and from any part of the geography of the world. This makes it difficult to have a coherent discussion among the people since different people might be at different places in the course at any given time. In particular, it is difficult for users that are in a given part of the course to find other users that are in the same part of the course at the same time. We call this first problem the cohort problem.

A second problem is that when the number of users gets large, answering all the questions is difficult. It would be useful to find an automatic way for users to be able to get their questions answered, particularly when users can join in the course at any given time, and when there might be no teaching assistants or teachers or advanced learners around to answer questions. We call this second question the question matching problem.

A third problem, called the approximate question matching problem, is when a user asks a question (or has a question) to find a previously asked question that is close to the user question. We can do this match using machine learning, or by giving the user a choice of approximately close questions to select from.

SUMMARY

In one aspect, in general, an interaction environment for presentation of content to a population of users includes either or both of a plurality of cohort interaction environments and one or more content-linked interaction environments.

In some examples, the content comprises educational and/or instructional content (e.g., multimedia lectures) for presentation to a population of students. Other examples of content include artistic content (e.g., movies, music) and recordings of live events.

In some examples, the content is associated with a linear presentation index or axis (e.g., time). For example, in a linear time multimedia (e.g., audio plus video and/or audio plus animation, etc.) presentation, a content location comprises a content time. In some examples, the content is divided into parts (e.g., exercises, lectures, chapters, topics) such that each part of the content has a range of content locations.

In some examples, the content has non-linear structure, for instance, with optional sections, branching structure, content directed structure etc. In such other examples, the content location may represent a state representing a history of content presentation (e.g., some users may reach a section in different sequences that other users).

1 Cohort Interaction Environment

Each cohort interaction environment is associated with a part of the population of users (referred to herein as a "cohort"), whereby users in that part of the population can interact through that environment. In some examples, users not in that cohort are excluded from that environment. The cohorts are not necessarily mutually exclusive.

The part of the population associated with a cohort interaction environment is defined by user characteristics including any one or a combination of two or more of:
  a content location or section of the content being presented to the user;
  a user location (e.g., geographic location, such as a country, state, province, city, or administrative unit, such as a school district, an online educational entity) of the user; and
  a competence level (e.g., grade level, measure of mastery of the content) of the user; and
  a language of interaction (e.g., for the content presentation and/or for interaction in the cohort interaction environment) or linguistic proficiency of the user.

The cohort interaction environment may provide an interface in which any user in the cohort of that environment can provide a message (e.g., comment, question) to other users of the cohort. In some examples, the interface maintains a history of messages, which may take the form of a scrolling "chat window" associated with a presentation of the content. In some examples, the messages are linked, for example, one message being an answer that is linked to a question in a previous message, or messages forming message threads.

In some examples, the messages of a cohort interaction environment may be associated with corresponding temporal locations (e.g., "wall clock time"), for example, according to the times those messages were provided by users, and the messages in the interface are ordered according those temporal locations. The messages may be ordered overall, or messages may be ordered within groups, for example, being presented as threaded discussions with temporal ordering within a thread.

2 Content Linked Interaction Environment

In some examples, at least some interactions between users are linked to content locations.

In some examples, the interactions include a first message provided by a first user when content at a first content location is presented to that user, thereby linking the first message to the first content location. An example of such a message is a question.

In some examples, the interactions include a second message linked to the first message, which is linked to the first content location, thereby linking the second message to the first content location. An example of such a message is an answer to a question such that both the question and answer are linked the same content location.

In some examples, the interaction environment provides, during presentation of content at a first content location, a representation of a first message associated with that first content location.

In some examples, an icon (e.g., a "Q" representing a question, or an "A" representing an answer) associated with the first message is presented in the presentation environment. A user interaction using the icon provides users with access to the first message, for example, by the user selecting (e.g., mouse clicking on) the icon.

In some examples, the content-linked interaction environment includes an interface in which messages (or representations of messages) are presented according to a content-location order. Such presentation can include presented in synchrony with the presentation of the content. Examples of such presentations include scrolling text windows, text "crawls", or icons and/or text "cartoon bubbles" embedded in a presentation of the content.

In some examples, the presentation of messages of the content-linked interaction environment are limited to a cohort of the user. Such limiting may include presenting graphical representations of messages from the user's cohort in a first mode (e.g., as icons). Messages from users of other cohorts may also be accessible in a second mode (e.g., as a pulldown or as search results).

In some examples, an interface for content-linked interactions provides a way of positioning the content presentation at a content location. For example, in a scrolling text window presentation of question and answer messages, a user may select a message (or series of message) causing presentation of content containing the content locations of the message(s).

Other features and advantages of the invention are apparent from the following description, and from the claims.

DESCRIPTION OF DRAWINGS

FIGS. 1 and 2 are annotated depictions of a graphical user interface of an interaction environment.

DESCRIPTION

1 Exemplary Techniques

Figure 1:
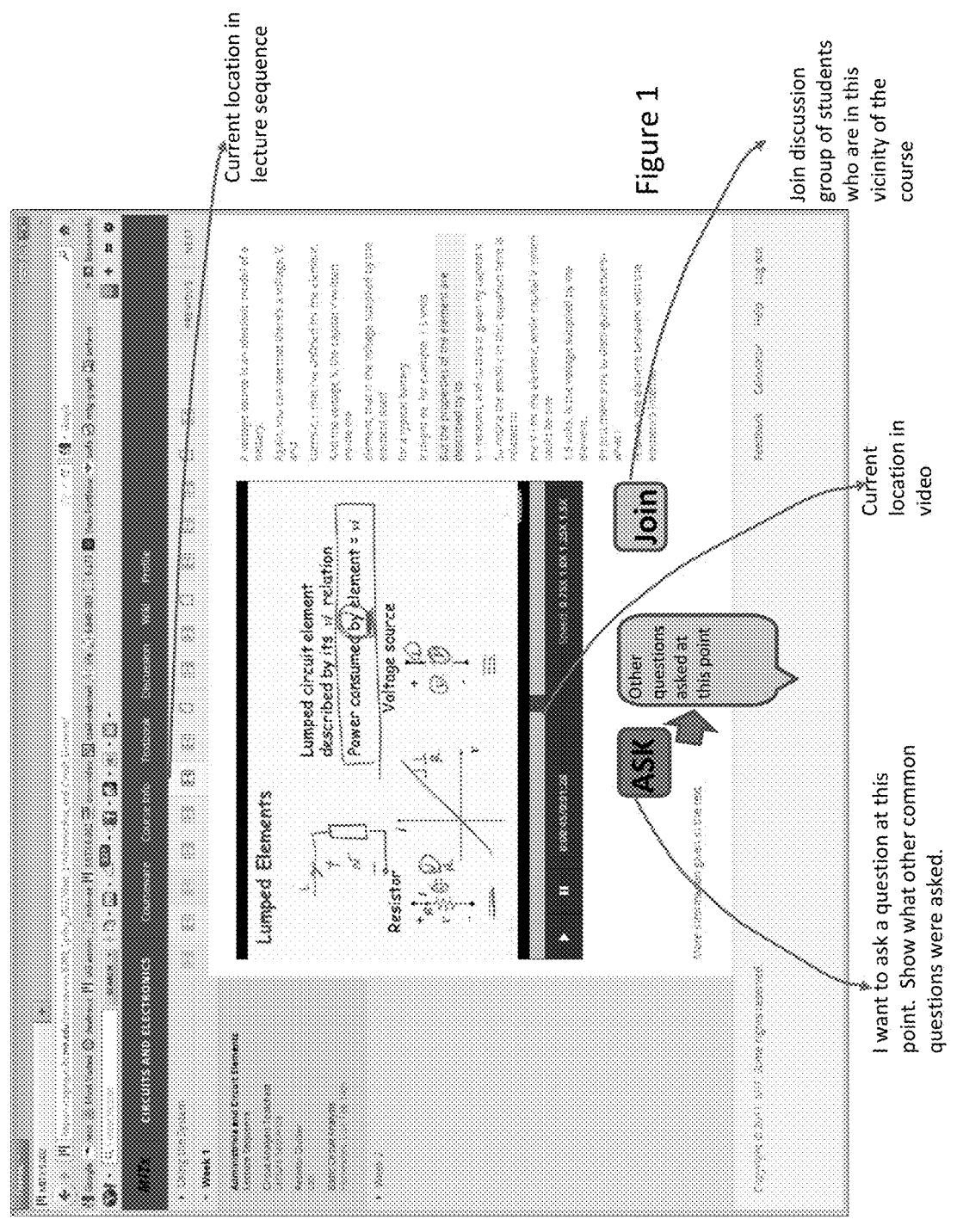
Figure 2:
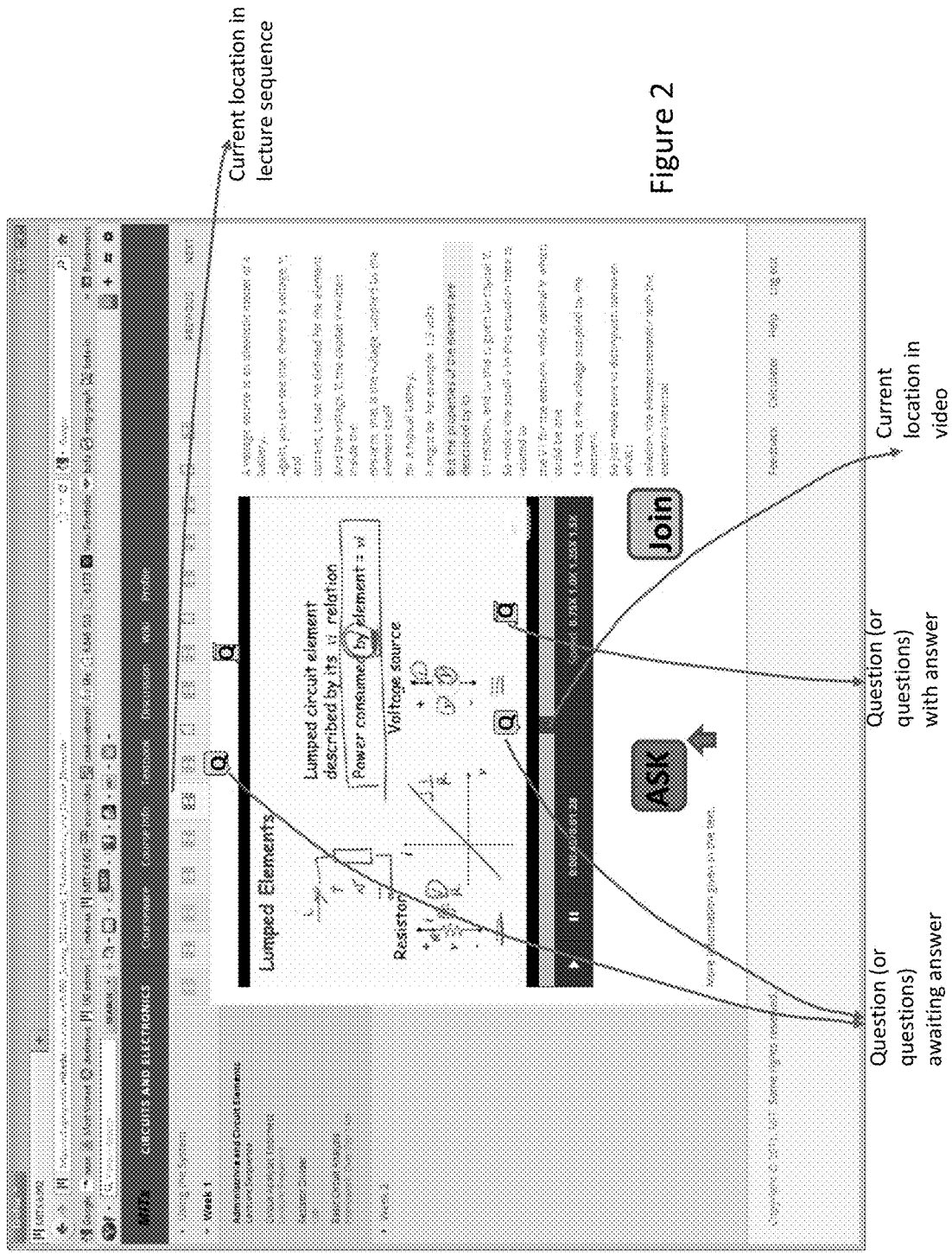

An approach to the cohort problem enables users to automatically be joined into subgroups. In some examples, these users are at approximately the same place in the course, or in the near vicinity in the course. We do so by providing a join button as shown in FIG. 1 which enters the user into a discussion forum (for example, a forum provided by askbot) populated by users that are in the same video segment for example. The users could also be in the same week, or in the same lecture sequence, for example. These are system settable choices. A given user stays in this forum until the user clicks on any part of the course that is outside of this subpart of the course.

A solution to the question matching problem enables users to automatically see the most common questions (for example, a small number of the common questions, say 5 to 20) others have asked when they were at the same point in the course. Referring to FIG. 2, if their own question is similar to the one someone else has asked, then they can simply select that question. If their question is different, then they go ahead and ask that question. The system will use various techniques including machine learning to figure out if there was any other question in the system that was like the question that was asked. If so, then several answers will be displayed and the user can select the most likely one.

If this was the first time this question was asked, then one of two things can be done. First the question is posted on the discussion forum so that someone else that might be signed on at that time has the opportunity to answer the question. The question location is also marked in the progression sequence that the user is going through using a question flag or a Qflag. If the question gets answered, then the Aflag can be posted near the qflag Furthermore, another aspect of the approach is that when a user is going through the material, previous questions or previous important questions asked at that point can be shown to them as a bubble (for example). A bubble or a icon can indicate that at that point in the course, e.g., a small flag at a point below a video, someone else had had a question. We call this a Qflag (or question flag). The user can then click on that flag and see what the other question was. If it is the same question they had, then can vote that question up. And if there is an answer, they can look at that too. Let us call this answer an Aflag. An different symbol indicating an answer flag can be shown near the Qflag if an answer is available. If it is a different question, then can enter their question and we treat it like the previous paragraph.

As user is going through the course, they also have the opportunity to answers questions. If a user sees a Qflag as indicated in FIG. 2, then they can clock on the Q flag and answer that questions.

Incentives for answering questions can also be provided using an economic system. For example, each time a person asks a question they have to offer to pay something (for example dollars, or education points, etc). If someone answers that question then they collect the points offered by the person asking the question. As a person goes by a question, if they have the same question, for example, they can choose to increase the economic incentive for someone to answer that question. They can do so by clicking on the question (or right clicking) and using menu choosing which of several alternatives they want: answer the question, add to the economic incentive, vote the question up, etc. Or they can ask a different question at that point.

We can also combine the questions with machine learning techniques or other techniques to find best possible matches for questions. We can also use NLP natural language processing techniques to find matches.

2 Description

One technology to make our solutions work is to have the concept of a sequence. A user follows a clearly defined time sequence.

Our approach will keep track of where a user is in the course and allocate a tag corresponding to that location in the course. This tag is called a course-location id or CL id. This CL id is a useful technology for enabling a host of solutions around the problems of distributed discussions. When the user wants to ask a question and makes some indication of doing so (for example, by clicking on a help or question button), the user will also get a time id (called TL id or temporal location id) indicating that the absolute date and time when the user is at that point in the course and when the user is looking to ask a question or looking for help. Each user can also have a geographical location id or GL id.

We can also maintain 3 tables. The CL table, the TL table and the Gl table. Each table has a number of rows. Each row can contain several elements. For example, one element can be a pointer to the list of users that are at that location (in time, course or geography). Each row can also contain a pointer to an appropriate object such as discussion forum that is suitable for that particular location. Each row could also contain a pointer to the list of questions (and associated answers if any) that were asked at that location.

We can also maintain multiple tables indexed by the CL, GL or TL ids. (As opposed to one table with multiple entries per row). These can be question/answer tables, user cohort tables or discussion group or forum tables.

2.1 Mechanism for the Cohort Problem:

We follow this algorithm to solve the cohort problem. The cohort problem is one where we want to find a discussion forum that is particular to the location in the course (or other location) in which the user is. We will use the discussion forum as an example without loss of generality, but in general it can be any type of grouping of objects (such as questions) that we want to associate the user with.

The user can also be further selected into a forum that is more suited to the user's abilities as measured by the user's current course performance.

The following are steps that can be followed in the design:
If join is clicked by user
Obtain exact location where click was performed
   (e.g., video segment, or time point, or geography using a GPS location for example)
Take the exact location and perform a hash function to obtain a CL id (or GL id or TL id)
   (or obtain all the ids)
Index into the discussion forum table using an id and obtain a pointer to the appropriate discussion forum (or set of discussion forums for this location)
   (or use a combination of one or several of the ids)
Possibly index (a second time around) into the set of discussion forums using a hash function of the user's current grade (for example) in the course We may also have a more global discussion forum that the user can click to get into. The global forum can further be divided into sub groups based on user ability, for example, as measured by the user grade.

2.2 Mechanism for the Question Matching Problem:

As depicted in FIG. 2, we assume that the user is going through some sequence of material, for example in an online course. The sequence may be a video, or it may be a sequence of videos and exercises, and readings for example. The user interface can show this sequence using a slider or a sequence of icons, etc.

When a user clocks on a video segment or on a sequence the user is entered into that part of the course and the id for that part of the course location (as indicated in our solution to the cohort problem) is obtained. The following sequence is followed next:

Obtain the id for the course location in which the user is
   Index into the question table and obtain the list of questions.
   Display the list of questions associated with the course location using an indication such as a balloon (see FIG. 2). The questions can optionally be associated with finer grained locations such as the exact time in the video that the question was asked. If a finer grained location is available for each question, then the question bubble can be displayed at the appropriate finer grained location in the sequence (see FIG. 2).

If the user clicks on any question, then display for the user a menu of options (e.g., answer the question, add or increase the economic incentive for that question, ask another question) so that the user can select from that menu and take an appropriate action.

We can also have a more adaptive and dynamic implementation as follows. In this scheme, we do not statically display all the questions for that course location. Instead we do this:

Obtain the id for the course location in which the user is.
   Index into the question table and obtain the list of questions and keep them handy (do not display).
   For each question obtain its finer grained location or exact location.
   As the user moves through the sequence, the exact location of the user is monitored.
   If the user's exact location matches that of one of the questions (or is the user approaches the vicinity of one of the tracked locations) then the question bubble is flashed on the screen near the user's location
   If the user clicks on any question, then display for the user a menu of options (e.g., answer the question, add or increase the economic incentive for that question, ask another question) so that the user can select from that menu and take an appropriate action.
   If the user ignores the bubble or question, then make the bubble disappear once the user has gone some distance beyond the location of the question bubble.

2.3 Approximate Matching of User Questions:

Next, the matching of user questions that were previously asked to new questions can be hard. A question asked by a user can be slightly different from a previously asked question but is more or less the same question nonetheless. We can use various techniques to match user questions in combination with all the previously discussed techniques. We can do the match in many ways—match just keywords, create semantic trees, use machine learning techniques, use natural language processing techniques, etc.

Alternatively, when a user asks a question, or clicks the intention to ask a question, the user can be shown all commonly asked questions at that location. The user can then select from one of the commonly asked questions. The user can then also be shown an answer should an answer exist. The user can then possibly up vote the question and or answer.

3 Alternative

Other alternative approaches for forming cohorts can be used independently or in conjunction with the techniques described above. For example, a large population of users may be cluster or partitioned according to criteria such as level of mastery of the subject matter, level of language skills, native language, geographic location. In sum examples, the clustering be based on specific skill patterns or types of errors made by the users, or by inferred points of view based on the user's comments or answers to questions. The forming of the cohorts may attempt to form relatively homogeneous groups. Alternatively, the forming of the cohorts may attempt to represent diversity in the group, for example, with different members of the group having different skill patterns, but with the group as a whole having mastery of all the skills. In this way, the nature of discussion among the cohort members may be facilitated to provide a good educational environment for the users.

4 Implementations

The techniques described above may be implemented in software. Such software includes instructions, which are stored on tangible machine-readable media, for causing one or more data processing systems to perform the steps and functions described above. The instructions may be compiled and executed by a physical or virtual processor, or may be interpreted. In distributed online environments, the data processing systems and associating execution of instructions may be distributed. For example, certain functions may be performed at server (or set of server), while other functions are performed at clients associated with the users. In some instances, the instructions executed at the clients maintain the graphical user interface for the user. The server may include a data storage subsystem, for example, a database, for maintaining the content for presentation and/or the interactions between users for presentation with that content. In some instances, a system for passing the content to the users is separate from a system for maintaining the interactions.

It is to be understood that the foregoing description is intended to illustrate and not to limit the scope of the invention. Other embodiments are within the scope of the following claims.

What is claimed is:

1. A computer controlled online interactive method for presentation of an educational course including sequential sections of educational content to a plurality of users accessing the educational course material from multiple geographic regions over a geographically-distributed computer network, the method comprising:

presenting the educational course, including the sequential sections of educational content to multiple of the users, the sequential sections of educational content being presented according to a time axis;

maintaining a plurality of content-linked cohort interaction environments for the educational course, each comprising a plurality of interactions between users, a first content-linked cohort interaction environment of the plurality of content-linked cohort interaction environments being associated with a first subset of users of the plurality of users and including a plurality of interactions between the first subset of users, the first subset of users receiving presentations of a first section of the educational content and being located in a first geographic region of the multiple geographic regions, and a second content-linked cohort interaction environment of the plurality of content-linked cohort interaction environments being associated with a second subset of users of the plurality of users and including a plurality of interactions between the second subset of users, the second subset of users receiving presentations of the first section of the educational content and being located in a second geographic region of the multiple geographic regions, wherein at least some of the interactions between users are linked to particular times on the time axis, the particular times being associated with corresponding locations in the sequential sections of educational content, and wherein interaction through each cohort interaction environment is synchronized to non-concurrent presentation of the sequential sections of educational content to the users, the synchronization being based at least in part on the associations of the particular times on the time axis with the corresponding locations in the sequential sections of educational content.

2. A computer controlled online interactive method for presentation of an educational course including sequential sections of educational content to a plurality of users accessing the educational course material from multiple geographic regions over a geographically-distributed computer network, the method comprising:

maintaining a plurality of cohort interaction environments for the educational course;

presenting the educational course, including the sequential sections of educational content to multiple of the users, the sequential sections of educational content being presented according to a time axis; and wherein each cohort interaction environment is associated with a subset of the plurality of users, a first cohort interaction environment of the plurality of cohort interaction environments being associated with a first subset of the plurality of users and including a plurality of interactions between the first subset of the plurality of users, the first subset of the plurality of users receiving presentations of a first section of the educational content and being located in a first geographic region of the multiple geographic regions, and a second cohort interaction environment of the plurality of cohort interaction environments being associated with a second subset of the plurality of users and including a plurality of interactions between the second subset of the plurality of users, the second subset of the plurality of users receiving presentations of the first section of the educational content and being located in a second geographic region of the multiple geographic regions, such that users in that subset of the plurality of users can interact through said environment, at least some of said interactions between users being linked to particular times on the time axis, the particular times being associated with corresponding locations in the sequential sections of educational content; and wherein interaction through each cohort interaction environment is synchronized to non-concurrent presentation of the sequential sections of educational content to the users, the synchronization being based at least in part on the associations of the particular times on the time axis with the corresponding locations in the sequential sections of educational content.

3. The method of claim 1 wherein the subset of the plurality of users associated with a cohort interaction environment is defined by user characteristics including any one or a combination of two or more of:

a content location or section of the content being presented to the user;

a user location;

a competence level of the user; and a language of interaction or linguistic proficiency of the user.

4. The method of claim 1, wherein maintaining the one or more content-linked interaction environments includes, during presentation of the sequential sections of educational content to a first user according to the time axis, accepting a first message provided by the first user at a first time on the time axis, the first time being associated with a first content location in the sequential sections of educational content, and linking the first message to the first time associated with the first content location.

5. The method of claim 4, wherein maintaining the one or more content-linked interaction environments includes, during presentation of the sequential sections of educational content according to the time axis, accepting a second message linked to the first message, which is linked to the first time associated with the first content location, and linking the second message to the first time associated with the first content location.

6. The method of claim 4 further comprises presenting sequential sections of educational content at the first time associated with the first content location to a second user subsequent to presentation of said first time associated with the first content location to the first user, including presenting a representation of the first message associated with that first content location.

7. The method of claim 1 wherein the sequential sections of educational content comprises graphical content.

8. The method of claim 1 wherein the sequential sections of educational content comprises at least one of video and animated content.

9. Software stored on a tangible non-transitory machine-readable medium comprising instructions for causing a computer processor to:

present an educational course including sequential sections of educational content to multiple users accessing the educational course from multiple geographic regions over a geographically-distributed computer network, the sequential sections of educational content being presented according to a time axis; and maintain an online interactive environment for presentation of the educational course to a population of users, the interactive environment including a plurality of content-linked cohort interaction environments, a first content-linked cohort interaction environment of the plurality of content-linked cohort interaction environments being associated with a first subset of users of the multiple users and including a plurality of interactions between the first subset of users, the first subset of users receiving presentations of a first section of the educational content and being located in a first geographic region of the multiple geographic regions, and a second content-linked cohort interaction environment of the plurality of content-linked cohort interaction environments being associated with a second subset of the multiple users and including a plurality of interactions between the second subset of users, the second subset of users receiving presentations of the first section of the educational content and being located in a second geographic region of the multiple geographic regions, each content-linked cohort interaction environment of the plurality of content-linked cohort interaction environments comprising a plurality of interactions between users, wherein at least some of the interactions between users are linked to particular times on the time axis, the particular times being associated with corresponding locations in the sequential sections of educational content, wherein interaction through each cohort interaction environment is synchronized to non-concurrent presentation of the sequential sections of educational content to the users, the synchronization being based at least in part on the associations of the particular times on the time axis with the corresponding locations in the sequential sections of educational content.

* * * * *